United States Patent Office 3,288,164
Patented Nov. 29, 1966

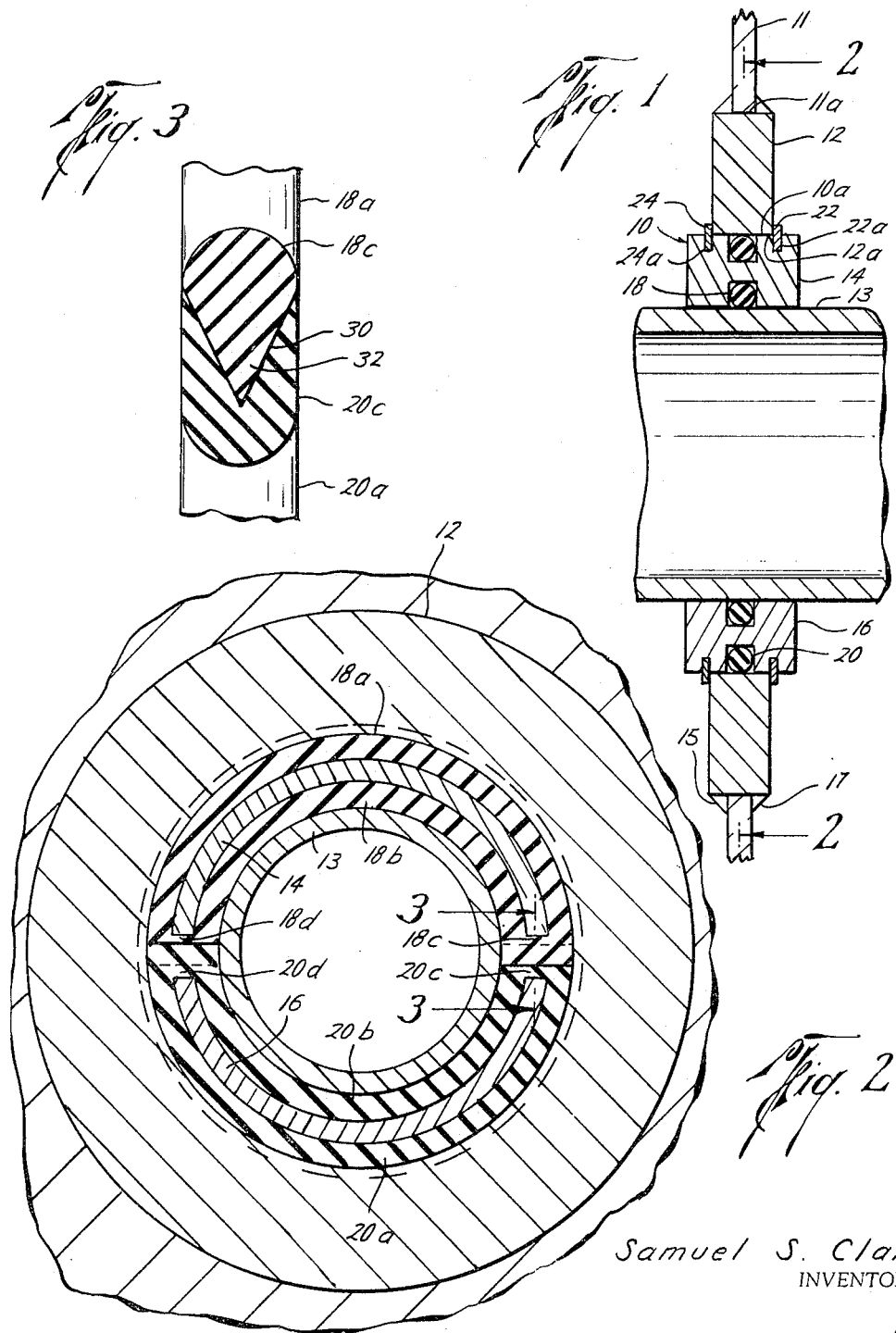

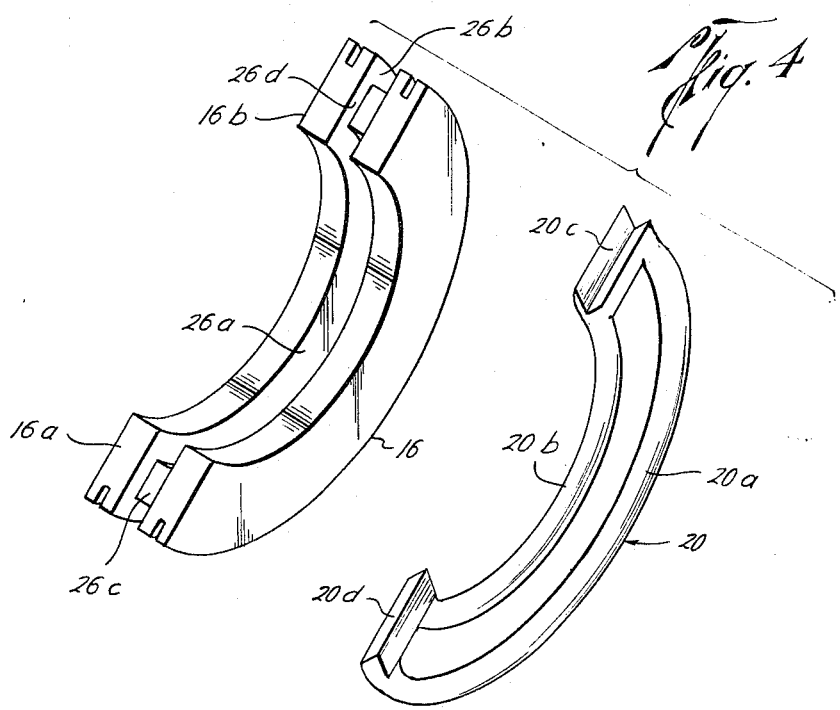
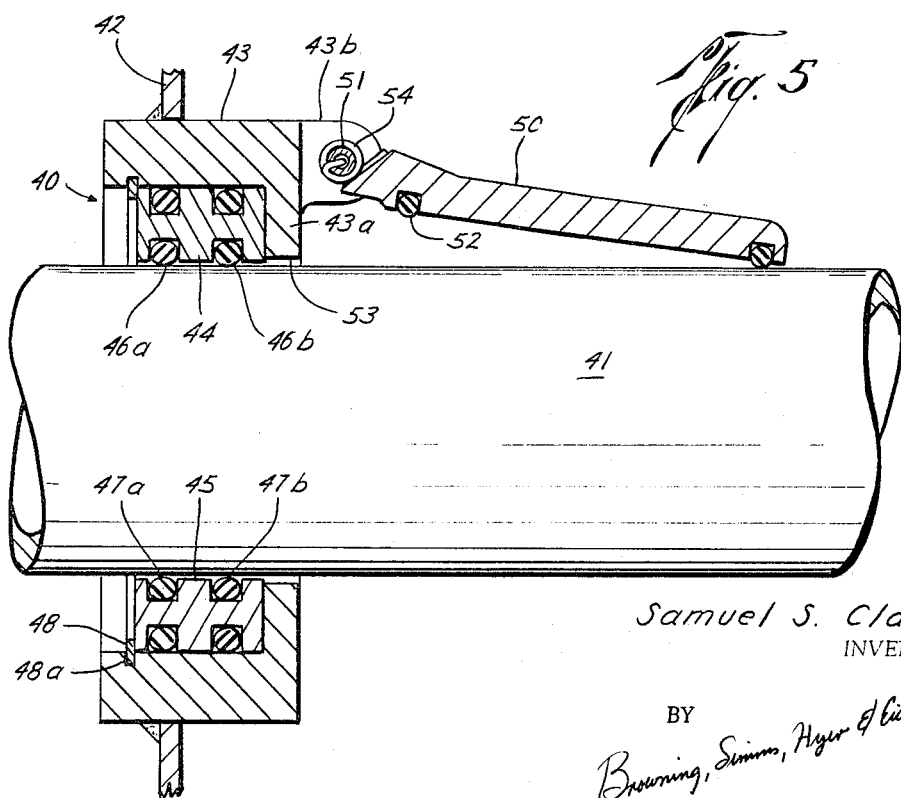

3,288,164
BULKHEAD SEAL
Samuel S. Clark, Houston, Tex., assignor to Keystone Valve Corporation, Houston, Tex.
Filed May 1, 1964, Ser. No. 364,156
9 Claims. (Cl. 137—320)

This invention relates to bulkhead seals generally, and, in particular, to bulkhead seals of the type used to provide seals between the bulkhead and elongated members such as pipe, electrical conduit, control rods, etc., which extend through the bulkhead.

There is a need for a bulkhead seal of this type which will allow a conduit, pipe, rods, etc., to be located in the opening through the bulkhead before the seal between it and the bulkhead is established. For example, a line made up of several joints of pipe screwed or otherwise connected together, and which extends through one or more bulkheads, can be much more easily assembled if this work can be done before the seals are established between the line and the bulkheads. Further, by installing the seals after the line is assembled, the likelihood of damaging the seals by rotating or otherwise moving the pipe during assembly, is eliminated.

Therefore, it is an object of this invention to provide a bulkhead seal for sealing between a bulkhead and an elongated member extending therethrough which allows the seal to be established after the member is located in the opening in the bulkhead.

It is a further object of this invention to provide a bulkhead seal in which the sealing members which provide the seal between the bulkhead and an elongated member extending therethrough, can be installed and removed without having to remove or disassemble the member extending through the bulkhead.

It is an other object of this invention to provide a bulkhead seal having a seal member which can be installed and removed from either side of the bulkhead.

It is another object of this invention to provide a bulkhead seal for sealing between a bulkhead and a member extending therethrough which will allow the member to be withdrawn and the seal members used with the seals to be replaced while preventing the flow of fluid from one side of the bulkhead to the other.

It is another object of this invention and one of its important features to provide a bulkhead seal which will support a differential pressure across the bulkhead in one direction at all times regardless of whether the member extending through the bulkhead is in position in the opening or not.

It is another object of this invention to provide a bulkhead sealer which will support a differential pressure across the bulkhead in one direction while the seals employed to provide a seal between the bulkhead and a member extending therethrough are removed and replaced.

It is another object of this invention to provide an assembly of seal members, for use in a bulkhead seal to provide a seal between the bulkhead and a member extending therethrough, which can be installed and replaced without removing or disassembling the member extending through the bulkhead.

These and other objects, advantages nad features are obtained in accordance with this invention by providing a bulkhead seal which employs a plurality of arcuate members, which can be arranged to encircle a member extending through the bulkhead, with each arcuate member being provided with its own seal means for sealing between the arcuate members and the bulkhead, the arcuate members and the member extending through the bulkhead and for sealing between the arcuate members. In this way, by limiting the length of the arcuate segments so that they will each encompass not more than 180° of arc, one or all of the segments can be removed and replaced without having to remove or disassemble the member extending through the bulkhead. Further, by providing separate seal means for each arcuate segment, one or all of the seal means can be installed or replaced without having to remove the member or disassemble it as some point to allow a seal ring to be either installed or removed from around it.

In accordance with another aspect of this invention, valve means are provided to close the opening through the bulkhead to prevent the flow of fluid through the opening in at least one direction when the member or conduit is removed from the opening. This feature not only allows a differential pressure to be maintained across the bulkhead at all times regardless of whether or not a conduit pipe, rod, etc., is extending through the opening and engaging the bulkhead seal, but it also allows the seal means used to provide the seal between the bulkhead and the conduit, pipe, rod etc., to be replaced while maintaining a differential pressure across the bulkhead.

The invention will now be described in detail below in connection with the attached drawings in which;

FIG. 1 is a vertical cross-sectional view through one embodiment of the invention showing the bulkhead seal assembled around a member extending through the bulkhead;

FIG. 2 is a sectional view taken along line 2—2 of FIG. 1 showing how the novel seal assemblies, which in this embodiment are carried by the arculate members, combine to effectively seal between the arcuate members and the member extending therethrough, and between adjacent arcuate members;

FIG. 3 is a sectional view taken along line 3—3 of FIG. 2 showing the arrangement employed in this embodiment for improving the seal between the adjacent arcuate segments which encircle the member extending through the bulkhead and for interlocking the seal member assemblies on adjacent arcuate members to help hold them in alignment;

FIG. 4 is an isometric exploded or disassembled view of one of the arcuate segments and seal member assemblies of this embodiment; and FIG. 5 is a vertical cross-section view of an alternate embodiment of the invention in which valve means are provided which will support a differential pressure across the bulkhead in one direction at all times even though the member extending through the bulkhead is removed.

A bulkhead seal illustrating one embodiment of the invention and generally indicated by number 10, is shown in FIGS. 1 through 4. In FIG. 1 and 2 it is shown providing a seal between bulkhead 11 and elongated member 13 which extends through the bulkhead. Member 13 is shown as being a tubular member, since conduits for water, steam and other fluids commonly pass through bulkheads, however, it could be a solid rod, a sheathed electrical cable, etc., and the bulkhead seal of this invention would function in the same manner.

As shown in the drawings, bulkhead seal 10 comprises housing 12, having an opening 12a through which member 13 extends. Also within opening 12a are arcuate members 14 and 16, which in turn hold seal member assemblies 18 and 20 in position to provide a seal between member 13 and housing 12, and, as will be explained in detail below, to also seal between arcuate members 14 and 16. Holding the arcuate members in position within opening 12a of housing 12 are snap rings 22 and 24. The snap rings are located in grooves 22a and 24a in arcuate members 14 and 16 and are positioned to engage opposite sides of housing 12 to thereby prevent longitudinal movement of the arcuate members relative to the housing.

Housing 12 is located in opening 11a in bulkhead 11. In the embodiment illustrated, the housing is held in position by welds 15 and 17 which also provide a seal between the housing and the bulkhead. Housing 12 could, of course, be an integral part of bulkhead 11 if an opening capable of being sealingly engaged by seal means 20 can be provided in the bulkhead and if the bulkhead has sufficient thickness to provide adequate sealing area.

In accordance with the invention, a plurality of arcuate members are used to encircle the member extending through the bulkhead and to hold the sealing means in sealing engagement with the member and housing 12. In the embodiment illustrated, two arcuate members 14 and 16 are used. Only two arcuate members are used since it is usually considered desirable to keep the number of seals necessary to be maintained to a minimum. In other words, if three arcuate members are used, which could easily be done, another joint would be introduced which must be sealed, thus providing another point where a possible leak can occur. Two is the minimum number, of course, which can be used and allow them to be removed and installed from their position encircling member 13 without having to remove or disassemble the number. The member should also encompass 180° or less of arc. They could be installed in position if one encompassed slightly more than 180° if either it or the member extending through the bulkhead was made of resilient material, however, they can be installed much more easily if each one will encompass no more than 180°.

In the embodiment illustrated the two arcuate members are identical, therefore, only arcuate member 16, which is illustrated in FIG. 4, will be described in detail. It is provided with an inner groove 26a and an outer groove 26b. Two laterally extending grooves 26c and 26d extend across end faces 16a and 16b and interconnect the inner and outer grooves 26a and 26b respectively. In the embodiment shown, these grooves all lie in the same plane which is desirable since it allows seal means of the type used with this embodiment of the invention and which will be described below, to tend to maintain itself in the proper position within the groove.

In accordance with the invention, seal means are provided to maintain a seal between the respective arcuate members, between the arcuate members and housing 12 and between the arcuate members and member 13, thereby closing off one side of the bulkhead from the other. In the embodiment illustrated, seal member assemblies 18 and 20, which are identical, are used. Seal member assembly 20 is illustrated in FIG. 4 and comprises an outer arcuate seal member 20a, and inner arcuate seal member 20b and two laterally extending seal members 20c and 20d which interconnect the ends of the outer and inner seal members. Usually seal member assemblies 18 and 20 will be made from an elastomeric material which is readily molded and therefore it is usually desirable to mold these seal assemblies as an integral unit with laterally extending seal members 20c and 20d integrally connected to the inner and outer arcuate seal members 20a and 20b. Further, by interconnecting the seal members they will hold each other in position in the grooves on the arcuate members making the assembly of the seal members around member 13 much easier. For example, when seal 20 is installed on arcuate member 16 with seal member 20a in outer groove 26b and inner seal member 20b in the inner groove 26a, etc., the seal assembly will maintain itself in position on the arcuate member.

FIG. 2 illustrates how seal assemblies 18 and 20 when installed in position on arcuate members 14 and 16, which in turn are positioned within opening 12a encircling member 13, provide seals between housing 12 and the arcuate members 14 and 16, and between the arcuate members and member 13 which extends through the bulkhead, and also provides a seal between the ends of the arcuate members themselves. Thus, outer seal member 20a of seal assembly 18 to provide, in effect an annular seal which extends completely around opening 12a. The same is true of inner arcuate seals 18b and 20b. Thus, the outer and inner seal members and outer and inner grooves, provided therefor in the arcuate members, can be designed as conventional O-ring seals.

In the embodiment illustrated a seal is obtained between the ends of the arcuate members by designing the laterally extending seal members which interconnect the inner and outer seal members on the seal assembly so that when the arcuate members are installed around member 13 within opening 12a of housing 12, the laterally extending seal members will be forced into sealing engagement. In other words, the seal member assembly is so designed that in order to install the arcuate members in position in the annular space between the member 13 and housing 12, the laterally extending seal members must be compressed between the adjacent end faces of the arcuate members. The amount of compression placed in these laterally extending seal members will depend upon the amount of pressure differential anticipated and other factors.

Means are also provided to obtain a greater amount of surface engagement between the laterally extending seal members and also to tend to interlock the adjacent laterally extending seal members to tend to help maintain the two seal assemblies in vertical alignment. In the embodiment shown this is done by providing the members with interengaging protrusions and grooves. Thus, as shown in FIG. 3, laterally extending member 20c is provided with groove 30 and laterally extending seal member 18c is provided with protrusion 32 which is designed to fully engage groove 30. In the particular embodiment illustrated the groove and protrusion are V-shaped and extend the length of the individual seal member. By designing the groove to be slightly smaller than the protrusion a wedging action is obtained which increases the normal force between the two members which, in turn, of course, can be varied from that shown, and improves their sealing ability.

Thus, a bulkhead seal is provided which allows member 13 to be inserted through opening 12a of housing 12 of the bulkhead seal and connected or assembled or otherwise installed into position before the seal is established between it and the housing. Also, should it be necessary, or desirable at any time to change either one or both the seal assemblies 18 or 20, the arcuate members can be quickly and easily removed and the seal assemblies thereon replaced and the bulkhead seal reassembled without having to break, disassemble or otherwise disturb the position of member 13 in any respect.

An alternate embodiment of the invention is illustrated in FIG. 5 and this embodiment is particularly adaptable for use where there will be a known differential pressure existing across the bulkhead and the direction in which this differential pressure will exist is known. For example, in storage vessels, pressure tanks, etc., a bulkhead seal of this type can be used to provide an opening for both the discharge or fill-up line allowing either to be extended into the tank or vessel from time to time and withdrawn after they have served their purpose.

In this embodiment of the invention, the bulkhead seal, generally indicated by the number 40 is arranged to provide a seal between an elongated member 41, which is shown as a tubular member such as a pipe for filling or emptying a tank and bulkhead 42 which may be the wall of a tank or storage vessel. Generally, the individual members of bulkhead seal 40 are identical with those described above in connection with the embodiment shown in FIGS. 1 through 4. There are some differences, however. For example, its housing 43, which corresponds with housing 12, FIG. 1, is provided with an inwardly extending flange 43a which functions to prevent longitudinal movement of arcuate members 44 and 45 in one direction, in the same manner as one of the retaining rings 22 in the previous embodiment. Further, arcuate members 44 and 45 have the same configuration as arcuate members 14 and 16 except that two sets of grooves are provided so that two seal assemblies can be installed on each arcuate member. In other words arcuate members 44 and 45 are shown provided with grooves to accommodate seal assemblies 46a, 46b, 47a and 47b. This simply doubles the insurance against leakage through the bulkhead seal. The seal assemblies are identical to those described above.

The arcuate members are held in position within housing 43 against inwardly extending internal flange 43a by snap ring 48, which, in this case, is located in groove 48a provided in housing 43.

Means are also provided to maintain a differential pressure across wall 42 when member 41 is withdrawn from its position within bulkhead seal 40. In the embodiment illustrated, valve member 50 is pivotally mounted to housing 43 by means of pin 51 which extends through aligned openings in valve member 50 and ears 43b. Valve member 50 is provided with seal means 52 arranged to engage inwardly extending flange 43a and close opening 53 through flange 43a when member 41 is withdrawn.

Since it is the purpose of this valve to maintain a differential pressure which is expected to exist across the bulkhead seal, it will generally be closed by this very pressure. By arranging the pivot point of valve member 50 so it will be urged downwardly across opening 53 by gravity, further assurance will be provided that the valve will close. In addition, resilient means can be provided to urge valve 50 towards its closed position. In the embodiment illustrated, coil spring 54 is provided for this purpose.

Thus, with bulkhead seal 40 installed in the wall of a tank, a fill-up line such as line 41 shown, can be inserted into the tank and it will be sealingly engaged by the seal assemblies carried by the arcuate members. The line itself will force valve member 50 out of sealing engagement with flange 43a and fluid can be either pumped into or withdrawn from the tank. Then when this operation is completed, line 41 can be withdrawn and valve member 50 will close the opening through the bulkhead seal preventing the escape of fluid from the tank.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and it within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A bulkhead seal for providing a seal between a bulkhead and an elongated member extending therethrough, comprising a housing, having an opening therein through which such elongated member may extend through the bulkhead, a plurality of arcuate members adapted to be positioned in the opening in the housing to encircle such elongated member; and seal means located between and in sealing engagement with adjacent arcuate members, between and in sealing engagement with the arcuate members and the housing, and between and in sealing engagement with the arcuate members and the elongated member extending through the bulkhead.

2. A bulkhead seal for providing a seal between a bulkhead and an elongated member extending therethrough, comprising, a housing mounted in the bulkhead and having an opening through which such elongated member may extend through the bulkhead; a plurality of arcuate members adapted to be positioned in the opening in the housing to encircle such elongated member extending therethrough, each arcuate member having an outer groove adjacent the housing and an inner groove adjacent such elongated member; seal means located in the grooves to provide seals between the arcuate members and the housing, and between the arcuate members and such elongated member, and seal means located between adjacent arcuate members to provide seals therebetween.

3. A bulkhead seal for providing a seal between a bulkhead and an elongated member extending through the bulkhead, comprising, a housing, adapted to be located in the bulkhead, and provided with an opening therein through which such elongated member may extend; a plurality of arcuate members adapted to be positioned in the opening in the housing to encircle such elongated member extending through the opening; each arcuate member having an outer groove adjacent the housing and an inner groove adjacent such elongated member, said inner and outer grooves lying in parallel planes which are perpendicular to the longitudinal axis of the opening in the housing, said members being further provided with lateral grooves which interconnect the ends of the outer and inner grooves and which are located to face the lateral grooves in the adjacent arcuate member when the arcuate members are arranged in the housing encircling such elongated member; and seal means located in the grooves to provide seals between the arcuate members and the housing, the arcuate members and such elongated member extending through the bulkhead, and between adjacent arcuate members.

4. The bulkhead seal of claim 3 in which each arcuate member is provided with a seal assembly having an outer arcuate seal member located in the outer groove, an inner arcuate seal member located in the inner groove and laterally extending seal members located in the lateral grooves and integrally connected to the outer and inner seal members.

5. The bulkhead seal of claim 4 in which one of the laterally extending seal members on each seal assembly is provided with a laterally extending groove and the other laterally extending seal member is provided with a protrusion the grooves and protrusions being shaped to engage the respective protrusions and grooves on the laterally extending seal members located in the lateral grooves of adjacent arcuate members.

6. The bulkhead seal of claim 3 further provided with a valve member pivotally attached to the housing and arranged to rotate from a first position extending transverse of the opening through the housing to a second position generally parallel to the longitudinal axis of the opening; and seal means for sealing between the pivotally mounted valve member and the housing, when the valve member is in its first position, to prevent the flow of fluid through the opening in the housing in one direction.

7. A bulkhead seal for providing a seal between a bulkhead and an elongated member extending through the bulkhead, comprising, a housing having an opening therein, adapted to be installed in the bulkhead; a plurality of arcuate members, located in the opening and arranged to encircle an elongated member extending through the opening, each member being provided with an outer groove adjacent the housing and an inner groove adjacent such elongated member, said arcuate members further having facing end surfaces provided with laterally extending grooves interconnecting the inner and outer grooves; a seal assembly carried by each arcuate member having an outer annular seal member located in the outer groove to seal between the arcuate member and the housing, an inner seal member located in the inner groove to provide a seal between the arcuate member and an elongated member extending through the housing; and laterally extending seal members integrally connected to the outer and inner seal members and located in the laterally extending grooves to seal between the arcuate members; and means for holding the arcuate members in position in the opening in the housing with the outer seal members in sealing engagement with the housing.

8. The bulkhead seal of claim 7 in which one of the two laterally extending seal members in the grooves provided in the facing end surfaces is provided with a protrusion and the other is provided with a cavity designed to receive the protrusion.

9. The bulkhead seal of claim 7 further provided with a valve member pivotally connected to the housing to rotate between a first position extending generally transverse of the axis of the opening and a second position generally parallel to the axis of the opening, and seal means for providing a seal around the opening between the valve member and the housing when the valve member is in its first position.

References Cited by the Examiner
UNITED STATES PATENTS

| | | | |
|---|---|---|---|
| 2,601,339 | 6/1952 | Snyder | 137—320 |
| 2,850,311 | 9/1958 | Mansfield | 277—192 |
| 2,861,435 | 11/1958 | Seaner | 277—198 X |
| 3,175,832 | 3/1965 | Carrell | 277—199 |
| 3,249,363 | 5/1966 | Chatfield | 277—1 |

SAMUEL ROTHBERG, *Primary Examiner.*